No. 643,826. Patented Feb. 20, 1900.
A. H. MARKS.
PNEUMATIC TIRE.
(Application filed Apr. 15, 1899.)
(No Model.) 2 Sheets—Sheet 1.
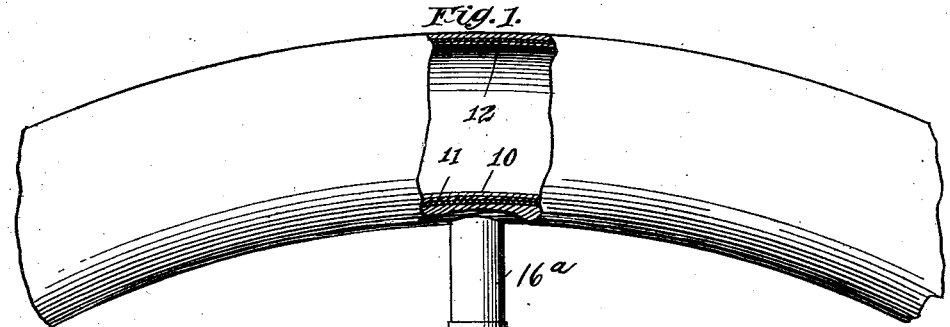
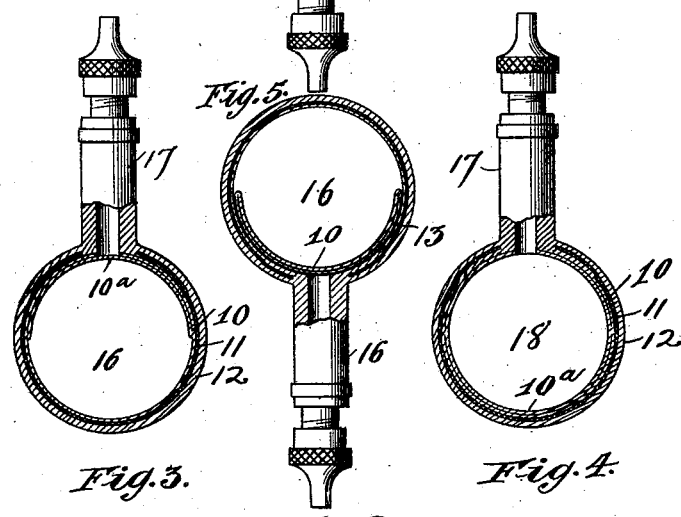
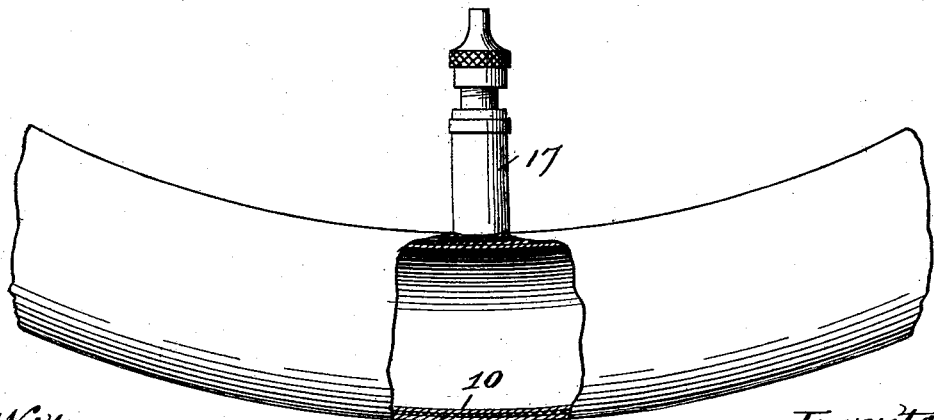

No. 643,826. Patented Feb. 20, 1900.
A. H. MARKS.
PNEUMATIC TIRE.
(Application filed Apr. 15, 1899.)
(No Model.) 2 Sheets—Sheet 2.
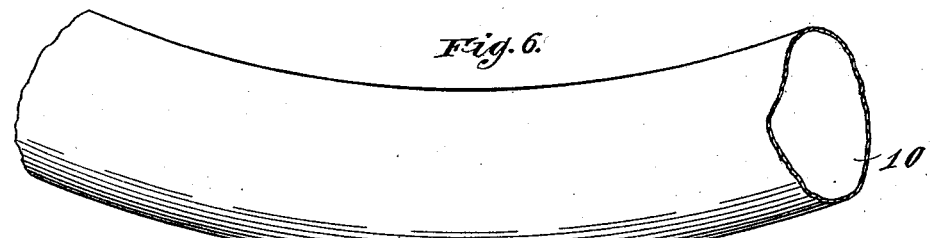
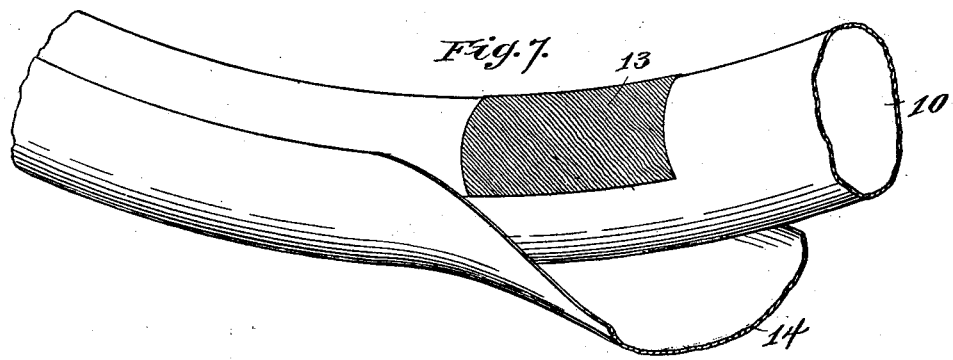
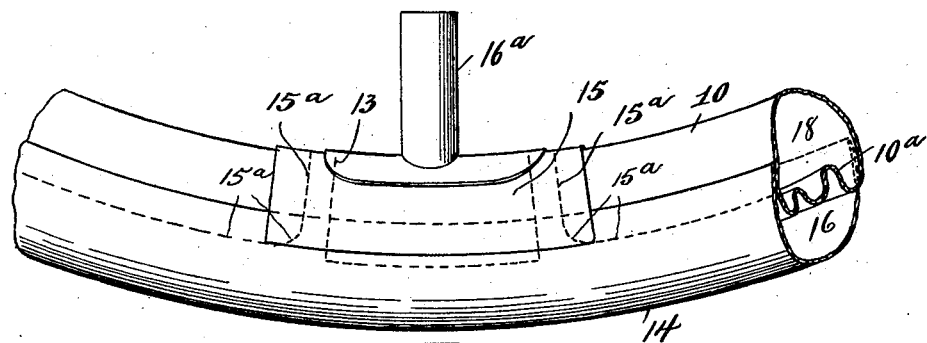
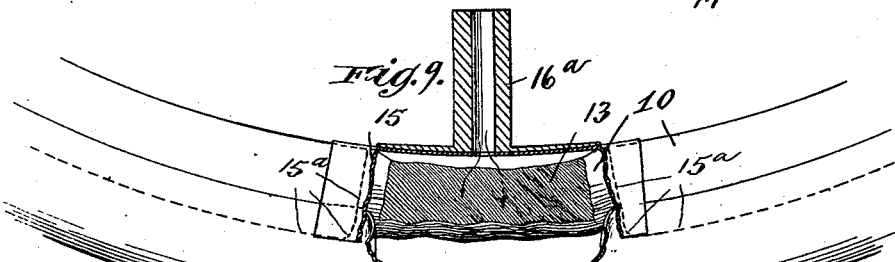
Witnesses:
F. M. Manus
Frederick F. Goodwin
Inventor:
Arthur H. Marks,
By Offield, Towle & Linthicum,
Attys.

UNITED STATES PATENT OFFICE.

ARTHUR H. MARKS, OF AKRON, OHIO, ASSIGNOR TO THE DIAMOND RUBBER COMPANY, OF SAME PLACE.

PNEUMATIC TIRE.

SPECIFICATION forming part of Letters Patent No. 643,826, dated February 20, 1900.

Application filed April 15, 1899. Serial No. 713,126. (No model.)

*To all whom it may concern:*

Be it known that I, ARTHUR H. MARKS, of Akron, in the county of Summit and State of Ohio, have invented certain new and useful Improvements in Pneumatic Tires, of which the following is a specification.

My invention relates to certain improvements whereby the trouble and inconvenience resulting from the puncturing of a pneumatic tire while on the road may be quickly overcome without removing the tire from the wheel or patching or plugging the perforation.

My improvement relates more particularly to that class of pneumatic tires known as "single-tube" or "hose-pipe" tires, which when punctured are difficult to repair, especially by novices. Numerous expedients—such as patching-strips, emergency air-tubes, internal diaphragms, and the like—have been suggested for repairing tires of this class; but so far as I am aware no means for repair of tires of this class has yet been provided which is not open to one or more serious objections, either as to its utility, conveniemce of manipulation, or cost of construction.

My invention provides a tire having a service air-chamber and an emergency-chamber each provided with an inflating-tube and air-valve, all arranged and combined in such a simple manner that the tire is economical in construction, readily manipulated for repair, and as serviceable when repaired as it was prior to the puncture.

In carrying out my invention I combine with the inner layer of the tube a strip of rubber approximately half the width of the inner layer and secured thereto in such manner that one wall of the inner layer of the tube constitutes a flexible diaphragm, which, together with the strip applied thereto, forms the service air-chamber, while the inner layer constitutes the emergency-chamber, each of said chambers being provided with suitable means for its inflation, and when the strip which thus constitutes the normal tread of the tire is punctured the other chamber is inflated, thus distending the diaphragm and restoring the tire to its normal inflated condition.

My invention is shown in the accompanying drawings, in which—

Figures 1 and 2 are sectional elevations of separate sections or parts of a tire. Figs. 3 and 4 are transverse sections of the tire at the point where the emergency-chamber valve is applied thereto, showing the diaphragm in two positions and the valve-tube in broken elevation. Fig. 5 is a similar view showing the service-chamber valve-tube. Figs. 6 to 9, inclusive, show various stages of the manufacture of the tire.

Referring to the drawings, 10 indicates the inner ply or layer, composed of such percentage of rubber as to make it capable of holding air under pressure.

11 represents a layer of fabric, and 12 the outer layer, of rubber.

In constructing the tire I first take a strip of material, which is to constitute the inner layer 10 of the tube, and either before or after it is brought to the tubular condition apply to one surface thereof, which is afterward to constitute the rim side of the tire, a patch of canvas 13, as shown in Fig. 7, cementing the same at its edges securely to said surface. I then apply a strip of rubber 14, of approximately half the width of the strip from which the tubular layer 10 is formed, to the surface of said strip or tube opposite that on which the patch 13 is applied, cementing the longitudinal edges of the strip 14 to the surface of the strip or tube 10, as clearly shown in Figs. 7 and 8. This cementing or securing is omitted over that part of the surface covered by the patch 13, and in order to provide an air-inlet space at this point I then employ a saddle-piece 15, of rubber, said saddle-piece being cemented at its ends, as indicated by the dotted lines 15$^a$, to the surface of the air-tube ply 10 and at its edges to the longitudinal edges of the strip 14. The air-tube for the service-chamber-inflating valve 16$^a$ is applied to the saddle-piece and communicates with the space beneath the same, and thereby with the service-chamber 16. At a separated point in the tire is provided a second air-tube 17, which communicates with the emergency-chamber 18. Now, assuming that the service air-chamber 16 is inflated, as shown in Fig. 3, and that a puncture occurs, all that is necessary to render the tire serviceable for further immediate use is the inflation of the emergency-chamber 18 through the tube 17, whereupon the diaphragm 10ª will be forced into contact with the surface of the strip 14, thus restoring the original contour of the tire.

In the foregoing I have omitted the particular description of the method of procedure subsequent to the uniting of the strip 14 to the layer 10. It will be understood, of course, that after these parts are thus united the fabric layer 11 and the rubber layer 12 will be applied, and the tire will then be vulcanized, thus uniting the several layers, except at the point beneath the saddle-piece and except also that in this process the parts 10 and 14 would only be united at the point where they were previously cemented.

An important utility in this tire is the simplicity and consequent economy of manufacture. It can be very rapidly and cheaply made and requires no difficult operation and but little additional material to supply the emergency-chamber. It also enables the valve-tubes to be applied in a very simple and yet efficient manner and renders the inflation of the emergency-chamber as easy and as certain as that of the service-chamber. In this construction also the diaphragm is held until needed against the rim side of the tire, while the strip 14 constitutes the tread portion. I have not attempted to illustrate or describe any modifications of my invention; but it is obvious that numerous variations may be made in the structural details illustrated and described.

I have described and shown the saddle-piece connected at its ends to the exposed surface of the inner layer 10 and at its side margins to the edges of the strip 14, thus bridging the space or point where the strip is separated from the tubular layer and constituting, with the upper surface of the latter, an air-passage the branches of which extend laterally down the sides of the tube and into the space between the latter and the strip or annulus. I prefer this construction; but it is obvious that the bridge-piece might be secured to one edge only of the strip, its other edge, as well as one edge of the strip, being secured to the surface of the tubular layer. It is also obvious that the end of the air-tube might be extended over the surface of the inner tubular layer, and thus provide a duct leading to the service-chamber, or such duct or passage might be formed in other ways. The method of manufacture herein described, as well as the article itself, is considered to be novel.

I am aware that it has heretofore been proposed to construct a tire the air-tube whereof is divided by a diaphragm into two separate chambers which are capable of independent inflation, and I therefore make no claim to such invention broadly, my present invention relating to the particular manner in which the division of the air-tube is accomplished and the separate inflation of its chambers rendered possible.

I claim—

1. A pneumatic tire having an interior continuous tubular layer of material capable of holding air under pressure, in combination with a strip of similar material applied to the outer surface of said tubular layer and having its longitudinal edges secured thereto except at one point, a bridge-piece secured at said point to the surface of the tubular layer and also to the strip, an inflation-tube communicating with the space thus provided between the bridge-piece and the tubular layer, and a second inflation-tube communicating with the interior of said tubular layer, substantially as described.

2. A pneumatic tire having an interior continuous tubular layer of material capable of holding air under pressure, in combination with a strip of similar material applied to the outer surface of said tubular layer and having its longitudinal edges secured thereto, except at one point, a bridge or saddle piece at said point having its transverse margins secured to the tubular layer, and its longitudinal margins secured to the free edges of the strip, an inflation-tube communicating with the space thus provided between the bridge-piece and the tubular layer, and a second inflation-tube communicating with the interior of said tubular layer, substantially as described.

3. The herein-described improvement in the art of making pneumatic tires and providing them with a service air-chamber and an emergency air-chamber, which consists in forming a layer of material into a continuous tube and applying thereto a strip of material by cementing or otherwise securing its longitudinal edges to said tubular member, except at one point at each margin, then securing a bridge or saddle piece at its ends to the surface of said tube and at its margins to the edges of said strip, applying suitable inflation-tubes to the saddle and to the tubular body and uniting the secured edges by vulcanization, substantially as described.

4. The hereinbefore-described improvement in the art of making pneumatic tires, which consists in forming a continuous tube of rubber, applying thereto a strip of rubber by securing the longitudinal edges of said strip to the sides of the tube, except at two opposite points, uniting the tube and strip at these points by means of a saddle-piece or bridge of vulcanizable material having its transverse margins secured to the tube and its longitudinal margins secured to the strip, connecting an inflation-tube to said saddle-piece and a second inflation-tube to the tube and subsequently uniting the several pieces by vulcanization or otherwise, substantially as described.

5. The hereinbefore-described improvement in the art of making pneumatic tires, which consists in forming a continuous tube of rubber, applying thereto a strip of rubber by securing the longitudinal edges of said strip to the sides of the tube, except at two opposite points, and uniting the tube and strip at these points by means of a saddle-piece or bridge of vulcanizable material having its transverse margins secured to the tube and its longitudinal margins secured to the strip, connecting an inflation-tube to said saddle-piece, providing an external tubular covering of fabric and rubber and an inflation-tube communicating with the first-mentioned rubber tube and uniting the several parts, except at the body of the saddle-piece, by vulcanization, substantially as described.

ARTHUR H. MARKS.

Witnesses:
A. H. NOAH,
W. B. MEELER.